United States Patent

Wong

Patent Number: 5,102,556
Date of Patent: Apr. 7, 1992

[54] METHOD FOR RENDERING FERRIC HYDROXIDE SLUDGES RECYCLABLE

[75] Inventor: Morton M. Wong, Placentia, Calif.

[73] Assignee: Union Oil Company of California, Los Angeles, Calif.

[21] Appl. No.: 502,287

[22] Filed: Mar. 30, 1990

[51] Int. Cl.$^5$ ............ C02F 1/62; C02F 1/52; C02F 11/00

[52] U.S. Cl. ............ 210/711; 210/712; 210/719; 210/722; 210/724; 210/737; 210/769; 210/912

[58] Field of Search ............ 423/94, 95, 146, 147, 423/150; 210/96.1, 199, 202, 203, 702, 709, 711–713, 717, 723, 724, 912–914, 688, 769, 737

[56] References Cited

U.S. PATENT DOCUMENTS

| | | | |
|---|---|---|---|
| 1,041,407 | 10/1912 | Alzugaray | 423/38 |
| 1,485,909 | 3/1914 | Christensen | 423/38 |
| 4,083,921 | 4/1978 | Wesely | 423/55 |
| 4,337,128 | 6/1982 | Haakousen et al. | 204/107 |
| 4,343,706 | 8/1982 | Etzel et al. | 210/667 |
| 4,448,696 | 5/1984 | White, Jr. | 210/711 |
| 4,680,126 | 7/1987 | Frankard et al. | 210/702 |
| 4,822,582 | 4/1989 | Weterings et al. | 423/321 R |
| 4,888,053 | 12/1989 | Grayson | 75/101 R |
| 4,940,337 | 7/1990 | Nakaji et al. | 210/912 |

FOREIGN PATENT DOCUMENTS

WO84/03692 9/1984 PCT Int'l Appl.

OTHER PUBLICATIONS

"Precipitation Stripping of Iron-Loaded Cation Exchange Extractants", by F. M. Doyle-Garner et al., Paper No. A85-11, The Metallurgical Society of AIME.

"Technology for the Removal of Heavy Metals from Industrial Wastewater", APTECH Union Oil Company of California, 10/85.

"Metal Recovery from Leached Plating Sludge", by D. F. Renard, pp. 46-49, Oct. 1987, Plating and Surface Finishing.

"Electrodialysis Regeneration of Chromium-Containing Solutions", by N. F. Kizim et al., translated from Zhural Prikladnoi Khimii, vol. 60, No. 4, pp. 949–952.

Primary Examiner—Stanley S. Silverman
Assistant Examiner—Neil M. McCarthy
Attorney, Agent, or Firm—Gregory F. Wirzbicki; William O. Jacobson

[57] ABSTRACT

A method is provided for selectively treating flocculated heavy metal contaminated iron-based sludges from an industrial waste water treatment process. The method removes the heavy metal contaminants with a minimum loss of the iron therein. The method comprises dissolving the sludge in hydrochloric acid to produce a ferric chloride solution. The solution is filtered to remove precipitated heavy metal salts, such as lead chloride. The filtrate containing the remaining heavy metal chlorides and ferric chloride is then cooled or otherwise treated to remove additional heavy metal chlorides. The remaining ferric chloride based solution is then reduced (exposed to iron powder) to a ferrous chloride solution and heavy metals. After filtration of any additional precipitated heavy metals, the ferrous chloride solution is ready for recycling. The precipitated/filtered heavy metal salts can be supplied to one or more conventional recovery processes to produce one or more heavy metals, instead of disposing of them as hazardous waste.

29 Claims, 2 Drawing Sheets

METHOD FOR RENDERING FERRIC HYDROXIDE SLUDGES RECYCLABLE

FIELD OF THE INVENTION

This invention relates to the removal of heavy metals from aqueous waste streams. More specifically, the invention is concerned with providing a secondary process which can recycle iron-based mixtures to a primary heavy metal treatment process while recovering heavy metal materials.

BACKGROUND OF THE INVENTION

There is increasing concern over the hazards posed by the rising levels of heavy metals in the world's water supplies. As used herein, the term "heavy metals" refers to both the cationic and anionic forms of non-ferrous metals and metalloids (e.g., arsenic) which have an atomic number greater than that of calcium. Most heavy metals are deemed toxic to some degree to all life-forms. In humans, toxic heavy metal poisoning can lead to severe nervous system disorders and, in extreme cases, death. Even trace amounts of heavy metals are potentially dangerous, because they do not decompose over time and often accumulate within an organism throughout its lifetime. This accumulation effect may be accentuated in succeeding species along the food chain.

As a consequence of this problem, "industry" is being forced to use treatment processes capable of virtually eliminating heavy metals from aqueous wastes. Often, however, this requirement is very difficult to fulfill. The metal finishing industry, for example, employs a variety of processes which, typically, generate large volumes of aqueous waste material. Many of these wastes contain unacceptable concentrations of heavy metals such as zinc, nickel, copper, chromium, lead, cadmium, iron, tin, gold, and silver. Since over a billion gallons of such wastes are generated daily by the 8000 or so metals finishing plants operating in the United States, it is obvious that a considerable amount of toxic waste solution is formed.

In response to this, numerous heavy metal removal methods including evaporation/crystallization, absorption, dialysis, electrodialysis, reverse osmosis and ion exchange have been proposed for the metals finishing and plating industries, with varying degrees of success. Another method is to sequester and remove toxic heavy metals in a flocculated coagulant comprised of one or more hydrated oxides of iron. A common method for removing these metals is by alkali precipitation, forming a semi-solid "sludge" of insoluble metal hydroxides, and disposing of this material by depositing it in a certified "toxic waste" landfill.

The heavy metal containing "sludge" material is typically toxic, but not primarily composed of heavy metals. Large amount of water or carrier materials are included with the heavy metals, creating additional materials for toxic disposal. However, the number of toxic waste landfills is relatively low and the price for disposing these wastes is increasing. For example, fees, transportation costs, and other expenses for such disposal can easily reach as much as $500/ton of sludge. This is besides the treatment and removal method operating costs, including chemicals, which can be significant. It would be highly desirable if the amount of sludge could be reduced and the removal method operating costs could be diminished.

SUMMARY OF THE INVENTION

The present invention treats iron based sludges containing heavy metals. In particular, it treats those sludges produced from a waste water treatment process involving the in-situ formation of an amorphous ferric hydroxide based sludge to "kinetically" sequester and remove the heavy metals from waste waters containing heavy metals. This technique, known as the Unipure SM process, is described in common assignee's copending U.S. application Ser. No. 042,565 filed Apr. 16, 1987 (EPO Application S/N 84901534.2) and U.S. application Ser. No. 07/359,872, filed May 1, 1989, both U.S. applications being incorporated hereinto by reference in their entirety. The Unipure process has proven to be highly effective in removing toxic metals from a variety of different types of contaminated waste water streams, with the flocculated sludge being a mixture of an amorphous, oxyferric hydroxide (hereinafter referred to as "ferric hydroxide") and various waste heavy metals.

In the preferred Unipure process, an aqueous liquid containing dissolved heavy metals and a ferrous containing mixture (generally a ferrous salt, e.g., ferrous chloride) is introduced in a reactor vessel and therein is rapidly oxidized, usually by air injection coupled with high agitation, so as to produce an amorphous precipitate or sludge containing a substantial proportion of the heavy metals from the liquid, generally at least 90%, and often virtually all of said heavy metals.

It is not certain whether the heavy metals in these sludges are primarily chemically "bound" or trapped during the rapid ferric hydroxide precipitation. While the precise structure of the ferric hydroxide/heavy metal containing mixture is not known, the sludge filter cake from the waste water treatment process normally contains up to about 80% water but is a free-flowing powder when dried. Because of this large amount of water, the disposal costs/ton of sludge are relatively high, and the economics of the process would be improved if at least some of this water could be utilized (or at least removed) and one or more of the toxic metals are profitably recovered from the sludge. Further, since the sludge is mostly iron hydroxide and this process starts with a ferrous chloride solution as the basis for the hydroxide precipitant, it would also be desirable to recover and convert most of the iron in the sludge back to ferrous chloride for reuse.

While heating the sludge for some period of time will remove the water and, therefore, lower the weight of the sludge, such a practice is not generally cost-effective. In addition, the various sludge processing techniques currently available have, so far, proven to be unable to prevent unacceptably large (i.e., in excess of about 25%) iron loses from the sludge so treated.

Examination of the sludge produced by the Unipure process shows that the heavy metals appear to be incorporated thereinto in two separate ways. Although the invention is not limited to any theory of operation, it appears that the largest percentage is either adsorbed onto the flocculated precipitate surfaces or physically entrapped or intricately "occluded" within the confines of the precipitated ferric hydroxide particles.

Accordingly, in the present invention, a method is provided for selectively treating flocculated heavy metal contaminated iron based (e.g., ferric hydroxide) sludges from an industrial waste water treatment facility, to remove the heavy metal contaminants therefrom, with a minimum loss of the iron therein. The method comprises dissolving a majority of the sludge in hydrochloric acid to produce a ferric chloride based solution. The dissolved material is filtered to remove the insoluble portion and some heavy metal chloride precipitates, such as lead chloride. The filtrate containing the remaining heavy metal and ferric chloride is then treated to remove another portion of the heavy metal chlorides. The ferric chloride solution is then reduced (exposed to iron powder or scrap iron) to a ferrous chloride solution, ready for recycling to the Unipure process after filtration to remove unreacted iron and a further part of the remaining heavy metals. The filtered heavy metal containing residues can be recovered by one or more conventional processes.

DETAILED DESCRIPTION OF THE INVENTION

Figure 1:
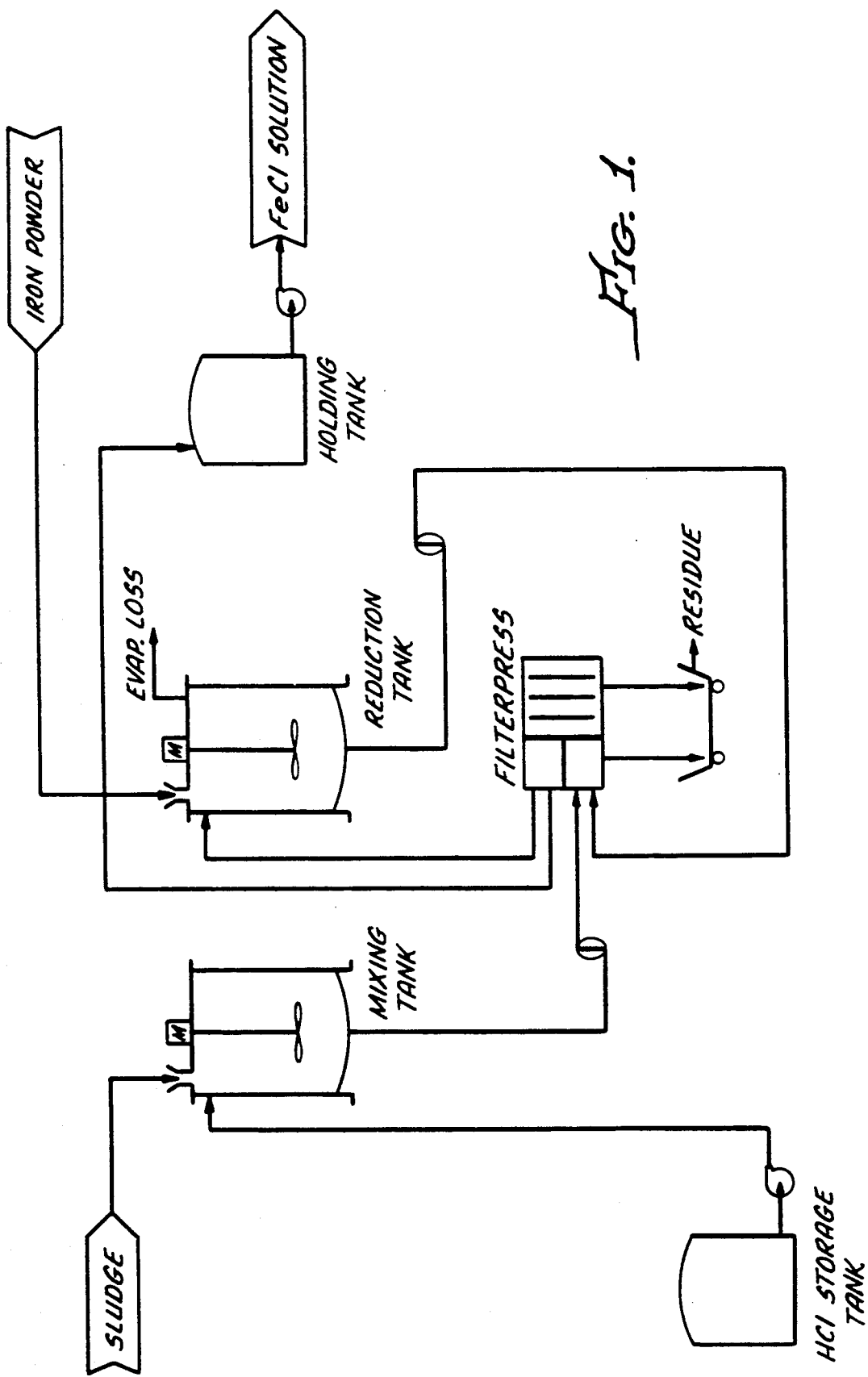
FIG. 1 shows a process flow schematic.

The preferred embodiment of the invention is shown in FIG. 1. Sludge is fed or pumped into the mixing tank along with HCl from the HCl storage tank. The sludge may be filter cake directly from a Unipure process or other iron-based wastewater treatment process, or may be dried (heated) prior to entry into the mixing tank. A majority of sludge is dissolved by the HCl, but some materials, such as hematite, may be insoluble. Other materials may form insoluble precipitates, such as lead chloride. The dissolved and solid mixture is pumped (e.g., using a slurry pump) to a filter press.

The filtrate is directed to a reduction tank and returned to the filter press. The reduction tank is also supplied with iron powder and agitated. The reduced mixture is pumped to return to the filter press where insoluble reduced materials/precipitates are removed as filter cake.

The filter cake(s) are discharged as residue in a solids handling truck. Alternatively, the residue can be fully or partially recycled (to further concentrate heavy metals), dewatered (to remove excess water), disposed of in an appropriate waste disposal facility, or supplied to a heavy metal recovery process.

Second filtrate is a ferrous chloride based solution and is supplied to a holding tank. The solution can be directly recycled to the Unipure process, or further processed prior to recycling.

Figure 2:
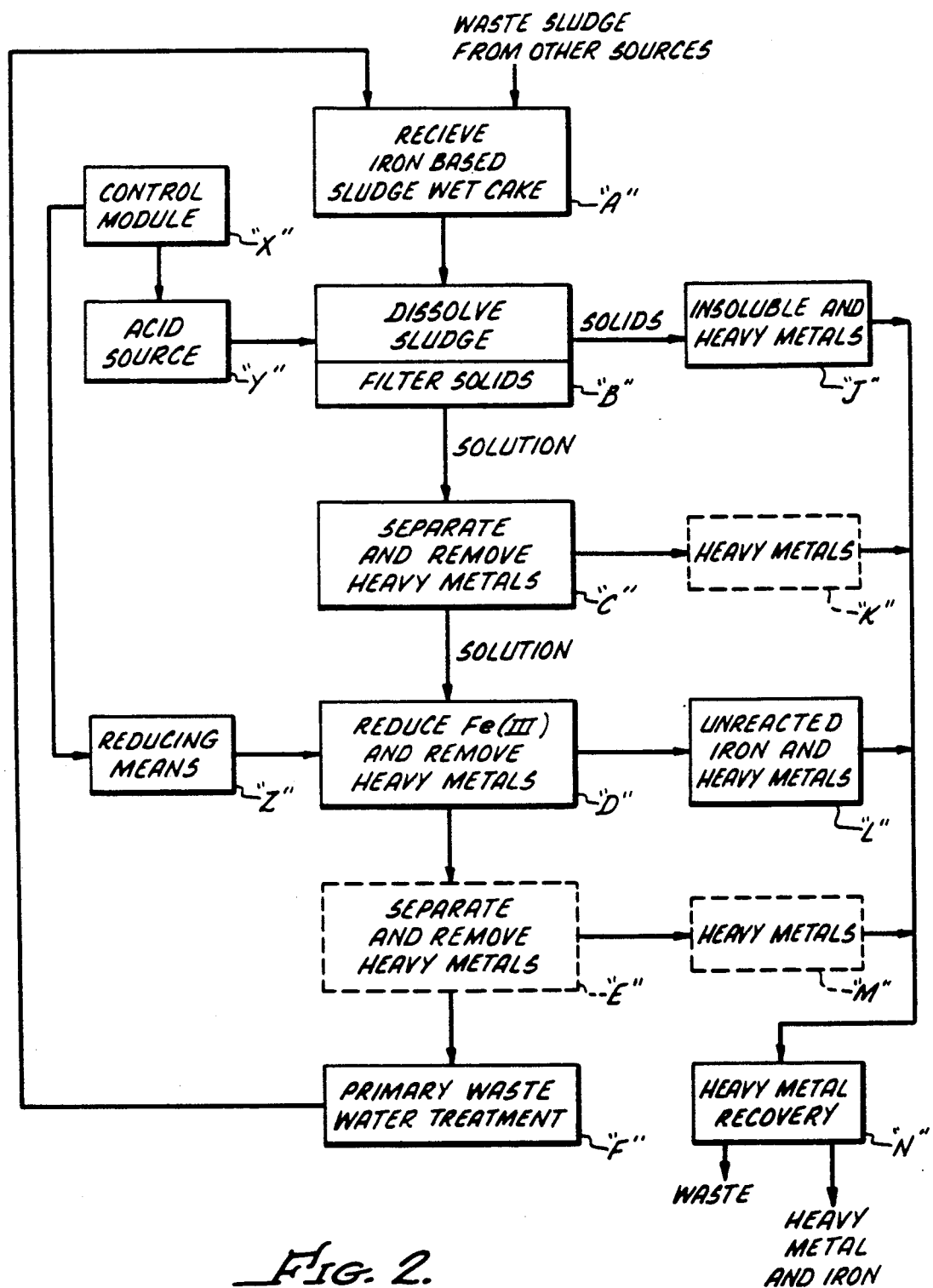
FIG. 2 show an alternative flow schematic.

An alternative embodiment is shown in FIG. 2. Step "A" receives the iron rich sludge filter cake containing heavy metals from the Unipure process "F." Step "A" may be accomplished in a holding hopper or other receiving means. The hopper may receive other heavy metal containing waste sludge or slurries from sources other than the Unipure process.

The wet sludge from the Unipure process consists primarily of flocculated ferric hydroxide precipitate but also contains heavy metals or heavy metal containing compounds. Iron (Fe) content of the sludge on a dry basis normally ranges from 40 to 60 percent by weight, but more commonly ranges from 45 to 55 percent by weight.

Alternatively, dewatering of the sludge can be accomplished prior to or after receiving the sludge in Step "A." Dewatering may be accomplished by heating, compression, or filtering means. Typical heavy metal contents in an industrial waste water stream application, such as a metal finishing facility waste, can vary dramatically. Contents typically include: lead (Pb) from zero or trace amounts up to 0.1 mg/l, zinc (Zn) ranging from 1 to approximately 100 mg/l (more typically less than 85 mg/l), copper (Cu) from zero or trace amounts up to 4.3 mg/l, chromium (Cr) from zero or trace amounts up to 12 mg/l, and nickel (Ni) from zero or trace amounts up to 0.9 mg/l. Unipure sludge water content can range from 70 percent by weight to 85 percent by weight, with the remainder composed of salts and other materials.

Dissolving step "B" adds and mixes, generally by agitation, a hydrochloric or other acid solution from source "Y" with the sludge. The type and amount of acid used varies depending upon the sludge to be handled and the type of reducing means employed, but a strong acid is typically needed to dissolve the iron and some of the various heavy metals.

The quantity of the hydrochloric acid addition from source "Y" are controlled by module "X." Alternatively, the module may also control HCl concentration, temperature and other properties. The module obtains information on the amount of iron in the sludge and determines the amount of acid to be added based the stoichiometric requirement for reaction (A) or (B) as follows:

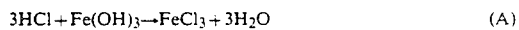
$$3HCl + Fe(OH)_3 \rightarrow FeCl_3 + 3H_2O \tag{A}$$

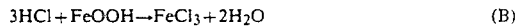
$$3HCl + FeOOH \rightarrow FeCl_3 + 2H_2O \tag{B}$$

The acid addition and agitation/mixing produces a ferric chloride based solution from the sludge. The temperature of the dissolving step "B" can be controlled to minimize mixing time. The amount of HCl is preferably controlled by module "X" to be within a range of from 90% to 110% of the stoichiometric amount calculated by equation A, most preferably 100%. Module "X" may be a manually controlled means or a microprocessor device.

The preferred range of HCl concentration when used on the dry sludge is from 10% to 16%, with a most desirable range of from 13% to 15%. Alternatively, sulfuric or other acids may be used as specific contaminants require. The acid dissolving step may be accomplished in a batch or continuous process. The sludge and acid mixture is normally contained in a mixing vessel of sufficient size to provide contact, agitation, mixing time, pressure and temperature to intimately mix the acid and sludge.

The temperature usually ranges from 20° C. to 100° C., preferably in a range from 23° C. to 95° C. In the most preferred embodiment, the temperature during acid dissolving ranges from 65° to 95° C., still more preferred at approximately 95° C. Mixing pressure is typically near atmospheric, but can be higher or lower in a appropriate pressure vessel. Mixing time usually ranges from 15 minutes to 24 hours, preferably in the range of 20 minutes to 4 hours depending upon the temperature. Mixing time can be further reduced by agitation in order to minimize costs. For example, a mixing vessel having a nominal capacity of 3.78 meters$^3$ is required for a Unipure sludge throughput of 2.65 meters$^3$. The added acid is preferably hydrochloric at a concentration usually ranging from 26 wt % to 37 wt % depending on the amount of Fe(OH)$_3$ and water in the sludge. The resulting dissolved mixture pH usually ranges from 1.0 to 0.1, preferably in the range of from 0.75 to 0.25. The nominal pH of the mixture is 0.5.

A solid/liquid separation removes undissolved material remaining after acid dissolving in step "B". The undissolved solid material may be filtered or settled out. In the preferred embodiment, lead chloride precipitate is filtered out and removed in Step "J."

Optional step "C" treats the dissolved filtrate to remove heavy metals "K," such as precipitation by chemical reactions or crystallization by cooling to ambient temperature. For example, remaining temperature sensitive lead chloride, can be precipitated and removed (e.g., by cooling to ambient temperature or less, typically to within a temperature range from 0° to 23° C.). Other metal chlorides may require other treatments to separate and remove them from the acidic ferric chloride (or ferric sulfate) solution. The treatments may include chemical precipitation, ion exchange or solvent extraction.

Step "D" reduces the cations in the filtrate using reducing means "Z" which is also controlled by module "Z." The ferric chloride solution is reduced to a ferrous chloride solution by mixing contact with iron powder in the preferred embodiment. This can also be accomplished by exposure to scrap iron, other chemical reducing agents having a similar electromotive force, or an electrolytic cell. The amount of reducing iron is based upon any excess acid used and the amount needed to convert the ferric to ferrous form, plus an amount to reduce the other heavy metal ions.

The usual temperature of reducing is within the range of 20° C. to 100° C. The preferred temperature of reducing is within the range of from 65° C. to 95° C. The usual pH range is from 0.5 to 4.0, but the preferred range is from 2 to 3. Other process variables, such as mixing time, are dependent upon temperature, agitation and other conditions. Considerations in selecting mixing time is comparable to the hereinbefore described dissolving step mixing time.

The reducing step "D" may also produce solid residue "L", which can be removed in Step "D." Again, a filter or a settling tank/clarifier are possible removal means.

Again, the reduced solution may also be treated in optional Step "E" to remove other remaining heavy metals "M." This optional step may require other treatments prior to separation and removal from the reduced ferrous chloride (or ferrous sulfate) solution. The treatments may include solvent extraction, reverse osmosis, chemical precipitation, ion exchange, and electrolysis.

The separation and removal of heavy metal chlorides from the ferric, then ferrous, chloride solution produce a recyclable liquid product to the primary treatment process step "F." In the preferred embodiment, the primary process is the Unipure process which utilizes a stream of a ferrous chloride or ferrous sulfate solution having an ferrous ion content of 100–200 g/l and a total heavy metal content of less than 0.1 gram-mole/l.

In the preferred Unipure wastewater treatment process "F," an aqueous liquid containing dissolved heavy metals and ferrous ion (generally by addition of a ferrous salt, e.g., ferrous chloride) is introduced into a reactor vessel and therein rapidly oxidized, usually by air injection coupled with high agitation, so as to produce an amorphous precipitate. The amorphous precipitate contains a substantial proportion of the heavy metals from the liquid, generally at least 90%, and often virtually all of said metals.

The precipitated heavy metals may be economically recoverable in optional Step "N," rather than disposed as hazardous waste. The concentration of heavy metals by the four stages of separation and removal (steps B, C, D, and E) can produce several high quality process streams for the recovery/mining of heavy metals. For example, a primarily lead chloride precipitate from steps "B" and "C" could be treated by a re-crystallization recovery process to produce purified lead chloride crystals. Step "N" can be several different heavy metal recovery processes, since different removal streams can be segregated.

Still other alternative embodiments are possible. These include: a plurality of reducing steps; a plurality of cycles of acid dissolving; pretreating and pre-removal of process contaminants/poisons; using other solvents/dissolving means, such as nitric acid; use of agitators or other mixing means during dissolving and reducing steps; using other separation/removal treatment methods for heavy metal chlorides; controlling dissolving means to directly produce ferrous chloride; and directly using ferric chloride stream to supply a primary process. The invention can also be applied to other iron- and heavy metal-containing aqueous solutions, such as contaminated ground water sources.

The invention satisfies the need to reduce the volume of hazardous waste and recycle ferrous chloride or ferrous sulfate while recovering valuable heavy metals. It uses low cost chemicals, such as HCl or $H_2SO_4$, and simple separation means, such as filtration.

The invention is further described by the following example(s) which are illustrative of specific modes of practicing the invention and are not intended as limiting the scope of the invention as defined by the appended claims. The example(s) are derived from laboratory testing of the sludges obtained from a galvanizing plant having a Unipure process treating its waste water stream.

EXAMPLE 1

Approximately ten and fifty gram samples of dried Unipure sludge were obtained. A representative analysis is given in Table 1.

TABLE 1

| METAL ION ANALYSIS OF SLUDGE SAMPLE 1 | |
|---|---|
| METAL ELEMENT | % BY WEIGHT |
| Fe | 54 |
| Pb | 7.4 |
| Zn | 0.3105 |
| Cu | 0.0640 |
| Cr | 0.0415 |
| N | 0.0420 |

An x-ray diffraction analysis of the sludge indicated it was mostly gamma-FeOOH. A small amount of $NH_4Pb_2Cl_5$ was also detected. The sludge samples were dissolved in 6.8, 10, 13.1, 16, and 19.4 wt % HCl at a temperature of 95° C. and stirred for 20 to 30 minutes, forming a slurry. The amount of HCl used in all tests was equal to the stoichiometric requirement for reaction (C):

$$3HCl + FeOOH \rightarrow FeCl_3 + 2H_2O \qquad (C)$$

The resulting slurry was filtered hot, and then the filtrate was cooled to ambient temperature. After standing overnight, the primarily $PbCl_2$ precipitate was then separated by filtration. Analysis of the filtrate is given in Table 2.

TABLE 2

ANALYSIS OF FERRIC CHLORIDE SOLUTION

| ELEMENT | SAMPLE VALUES | | | | |
|---|---|---|---|---|---|
| Run # | 8830 | 8846 | 8844 | 8850 | 8838 |
| HCl Conc., % | 6.8 | 10 | 13.1 | 16 | 19.4 |
| Fe, g/l | 36 | 53 | 68 | 87 | 114 |
| Pb, g/l | 0.93 | 1.14 | 1.3 | 1.56 | 2.14 |
| Zn, g/l | 0.214 | 0.322 | 0.400 | 0.500 | 0.670 |
| Cu, g/l | 0.045 | 0.068 | 0.087 | 0.106 | 0.130 |
| Cr, g/l | 0.033 | 0.049 | 0.062 | 0.080 | 0.100 |
| Ni, g/l | 0.038 | 0.049 | 0.062 | 0.82 | 0.110 |
| pH | 1.11 | 0.98 | 0.76 | 0.55 | 0.14 |
| Fe recovery, % | 92 | 90 | 88 | 90 | 97 |
| Solid waste reduction, % | 97 | 98 | 98 | 98 | 97 |
| Pb removal, % | 83 | 85 | 88 | 88 | 87 |
| Zn removal, % | 5 | 5 | 10 | 10 | 0.8 |

Fifty ml of the ferric chloride solution was heated to 65° C., and iron powder was added and stirred for two hours in the regeneration of ferrous chloride solution for the Unipure process. The amount of iron powder was nominally equal to 200 wt % for the stoichiometric requirement for reaction (D):

$$Fe + 2FeCl_3 \rightarrow 3FeCl_2 \quad (D)$$

The solids were then filtered, and the analysis of the filtrate is given in Table 3.

TABLE 3

ANALYSIS OF REGENERATED SOLUTION FROM SAMPLE 1

| ANALYSIS ELEMENT | SAMPLE VALUES | | | | |
|---|---|---|---|---|---|
| Run # | 8830 | 8846 | 8844 | 8850 | 8838 |
| Fe, g/l | 104 | 97(?) | 124 | 158 | 190 |
| Pb, g/l | 0.09 | 0.50 | 1.38 | 1.5 | 2.17 |
| Zn, g/l | 0.38 | 0.38 | 0.48 | 0.57 | 0.770 |
| Cu, g/l | <0.001 | 0.0067 | 0.008 | <0.01 | 0.098 |
| Cr, g/l | 0.011 | 0.036 | 0.07 | <0.01 | 0.11 |
| Ni, g/l | <0.01 | <0.02 | 0.05 | <0.01 | 0.098 |
| Fe(II)/Fe(total) | 96 | 96 | 96 | 98 | 96 |
| Total heavy metals, gram-mole/l | 0.0064 | 0.0090 | 0.0160 | 0.0160 | 0.0276 |

The Fe(II)/Fe(total) ratio was determined by the polarographic method. The solution meets the Unipure recycle criterion of total heavy metals less than 0.1 ram-mole/liter and Fe of 100-200 g/l in the ferrous chloride solution.

Table 4 shows the analysis results of the residue from the regeneration.

TABLE 4

RESIDUE FROM FERROUS CHLORIDE REGENERATION

| ANALYSIS ELEMENT | SAMPLE VALUES | | | | |
|---|---|---|---|---|---|
| Run # | 8830 | 8846 | 8844 | 8850 | 8838 |
| Fe, % | 73 | 67 | 66 | 59 | 71 |
| Pb, % | 4.5 | 2.62 | 0.46 | 1.07 | 0.247 |
| Zn, % | 0.28 | 0.0194 | 0.0287 | 0.029 | 0.056 |
| Cu, % | 0.45 | 0.45 | 0.37 | 0.52 | 0.286 |
| Cr, % | 0.246 | 0.124 | 0.147 | 0.322 | 0.072 |
| Ni, % | 0.272 | 0.204 | 0.117 | 0.221 | 0.062 |
| Residue-to-iron powder wt. ratio | 0.43 | 0.47 | 0.46 | 0.48 | 0.52 |

An inspection of the residue result shown in Table 4 shows a pickup of Pb, Cu, Ni and Cr by the iron powder addition. By the reduction potentials, one expects that Pb, Cu and Ni in solution could be reduced by the iron powder, however, it is not clear what form the Cr reports in the residue. The residue to iron powder ratios indicate that slightly over 50 percent of the iron powder used was consumed in the reduction. This is consistent with equation (D) and the amount of iron powder used.

EXAMPLE 2

Approximately twenty and thirty grams of dried Unipure sludge (as described in Table 1) were dissolved in 10, 13.1, and 16 wt % HCl at a temperature of 95° C. and stirred for 20 minutes or at ambient temperature for 24 hours to form a slurry. As in Example 1 the amount of HCl used in all tests were again equal to the stoichiometric requirement of the reaction (C).

The resulting slurry was filtered similar to Example 1. In the ambient temperature dissolution, the primarily $PbCl_2$ precipitate was separated by filtration with the insoluble materials. Analysis of the filtrate is given in Table 5.

TABLE 5

ANALYSIS OF FERRIC CHLORIDE SOLUTION

| ANALYSIS ELEMENT | SAMPLE VALUES | | | | | |
|---|---|---|---|---|---|---|
| Run # | 8860 | 8858 | 8868 | 8869 | 8848 | 8853 |
| HCl Conc., % | 10 | 10 | 13.1 | 13.1 | 16 | 16 |
| Temp., °C. | 95 | Ambient | 95 | Ambient | 95 | Ambient |
| Fe, g/l | 51.0 | 48.0 | 77.0 | 70.0 | 87.0 | 81.0 |
| Pb, g/l | 1.0 | 0.93 | 1.37 | 1.20 | 1.56 | 1.52 |
| Zn, g/l | 0.3 | 0.288 | 0.41 | 0.370 | 0.50 | 0.480 |
| Cu, g/l | 0.068 | 0.055 | 0.090 | 0.081 | 0.105 | 0.105 |
| Cr, g/l | 0.033 | 0.044 | 0.066 | 0.059 | 0.080 | 0.077 |
| Ni, g/l | 0.049 | 0.044 | 0.065 | 0.059 | 0.082 | 0.075 |
| pH | 0.82 | 0.82 | 0.63 | 0.73 | 0.55 | 0.60 |
| Fe recvry, % | 90 | 90 | 98 | 99 | 90 | 92 |
| Solid waste reduct., % | 98 | 96 | 99 | 97 | 98 | 98 |
| Pb remov. % | 87 | 87 | 87 | 88 | 88 | 87 |
| Zn remov, % | 8 | 6 | 10 | 10 | 10 | 5 |

The conversion of Fe(III) in ferric chloride solutions obtained by dissolving the Unipure sludge to Fe (II) with iron powder was accomplished at 65° C. and at ambient temperature. Fifty milliliters of the dissolved solutions were reacted with iron powder and stirred for two hours at 65° C. or 48 hours at ambient temperature. As in Example 1, the amount of iron powder was nominally equal to 200 wt % of the stoichiometric requirement for the reaction as shown in (C).

The solids were then filtered. The analysis of the filtrate from solutions prepared at ambient temperature is given in Table 6.

TABLE 6
ANALYSIS OF REGENERATED SOLUTION FROM AMBIENT TEMPERATURE PREPARED SAMPLES

| ANALYSIS ELEMENT | SAMPLE VALUES | | | | | |
|---|---|---|---|---|---|---|
| Run # | 8858 | 8858 | 8869 | 8869 | 8853 | 8853 |
| Regen Temp. | 65°C. | Amb. | 65°C. | Amb. | 65°C. | Amb. |
| Fe, g/l | 78 | 74 | 116 | 103 | 138 | 124 |
| Pb, g/l | 0.069 | 0.60 | 0.158 | 1.07 | 1.21 | 1.45 |
| Zn, g/l | 0.307 | 0.292 | 0.430 | 0.390 | 0.540 | 0.480 |
| Cu, g/l | <0.002 | <0.002 | <0.002 | <0.003 | 0.0045 | <0.002 |
| Cr, g/l | <0.005 | 0.017 | 0.005 | 0.006 | <0.005 | 0.012 |
| Ni, g/l | <0.020 | 0.020 | <0.020 | <0.020 | <0.020 | <0.020 |
| pH | 3.3 | 2.85 | 3.1 | 2.4 | 3.85 | 2.95 |
| Fe(II)/Fe (Tot.), % | 98 | 98 | 96 | 92 | 99 | 98 |
| Total heavy metals, gram-mole/l | 0.0052 | 0.0080 | 0.0074 | 0.011 | 0.014 | 0.015 |

The Fe(II)/Fe(Tot.) ratio was determined by the polarographic method. The regenerated solutions originally prepared from 13.1 and 16% HCl solutions meet the Unipure recycle criterion of total heavy metals less than 0.1 gram-mole/liter and Fe of 100-200 g/l. Table 7 shows the analytical results of the residue from the regeneration process. These results (Table 7) corroborate those shown in Table 4.

TABLE 7
RESIDUE FROM FERROUS CHLORIDE REGENERATION FROM AMBIENT TEMPERATURE PREPARED SAMPLES

| ANALYSIS ELEMENT | SAMPLE VALUES | | | | | |
|---|---|---|---|---|---|---|
| Run # | 8858 | 8858 | 8869 | 8869 | 8853 | 8853 |
| Temp. | 65° C. | Amb. | 65° C. | Amb. | 65° C. | Amb. |
| Fe, % | 69 | 77 | 54 | 59 | 59 | 63 |
| Pb, % | 4.5 | 1.75 | 2.53 | 0.53 | 1.33 | 0.40 |
| Zn, % | 0.0159 | 0.0087 | 0.0199 | 0.0188 | 0.035 | 0.0096 |
| Cu, % | 0.51 | 0.50 | 0.36 | 0.43 | 0.45 | 0.051 |
| Cr, % | 0.198 | 0.112 | 0.168 | 0.235 | 0.306 | 0.306 |
| Ni, % | 0.311 | 0.195 | 0.183 | 0.141 | 0.242 | 0.210 |
| Fe Consumption, % | 71 | 67 | 69 | 67 | 68 | 66 |

EXAMPLE 3

To determine the efficacy of using the regenerated ferrous chloride solution in cleaning industrial wastewater, a heavy metal-containing, iron based sludge (Table 1) was dissolved in a 13.1% HCl solution at ambient temperature with stirring for 24 hours, filtered, reduced the resultant ferric chloride solution with iron powder at 65° C. with stirring for 2 hours and filtered to produce a regenerated solution similar to Example 2, Run 8869 (65° C.) in Table 6.

This regenerated solution was added to 7 liters of wastewater (Table 8), which was adjusted to pH 8 with sodium hydroxide beforehand. The addition of regenerated solution to wastewater was at a ferrous ion to heavy metal ions mole ratio of 4:1. Air was bubbled through the mixture for 45 minutes with stirring to oxidize ferrous ion to ferric ion as the pH value was maintained at about 8 with small additions of sodium hydroxide. A few drops of a commercial flocculant was then added to the mixture at a ratio of 5-10 mg of flocculant per liter of the water mixture, which was then settled overnight before it was filtered. The heavy metal concentrations in the filtrate (the cleaned water) were all below detection limits (Table 8). Thus, the regenerated solution was proven effective in removing heavy metals.

TABLE 8
ANALYSIS OF WASTEWATER BEFORE AND AFTER TREATMENT WITH REGENERATED SOLUTION

| | Fe | Zn | Pb | Ni | Cr | Cu | Cd |
|---|---|---|---|---|---|---|---|
| Before, mg/l | <<0.005 | 47 | 21 | 21 | 20 | 5.2 | 3.0 |
| After, mg/l | 0.007 | <<0.002 | <<0.05 | <<0.04 | <<0.01 | <<0.005 | <<0.001 |

<<, lower than the detection limit.

While the preferred embodiment of the invention has been shown and described, and some alternative embodiments also shown and/or described, changes and modifications may be made thereto without departing from the invention. Accordingly, it is intended to embrace within the invention all such changes, modifications and alternative embodiments as fall within the spirit and scope of the appended claims.

What is claimed is:

1. A method for removing heavy metals from a ferric hydroxide sludge, said sludge produced from an initial process requiring the addition of a ferrous salt solution, said method comprising the steps of:
   a. dissolving a major portion of the sludge and at least a major portion of the heavy metals in an acid to form a heavy metal and ferric salt solution and an insoluble material;
   b. separating and removing most of the insoluble material from the ferric salt solution to form a residual ferric salt solution; and c. subjecting the residual ferric salt solution to a means for reducing the valence of the ferric salt to form a reduced solution; and d. recycling at least a portion of the reduced solution to the initial process.

2. The method of claim 1 wherein some of said heavy metals are not dissolved in said acid and said recycling comprises the steps of:

separating and removing at least a portion of a heavy metal containing material from the reduced solution to form a reduced residual solution; and recycling at least a portion of the reduced residual solution to the initial process.

3. The method of claim 2 which also comprises the step of: c. supplying said separated heavy metal containing materials from step b to a heavy metal recovery process.

4. The method of claim 3 for removing heavy metals from an aqueous waste stream which is capable of forming a mixture with a material produced from said initial process prior to step a, the method also comprising the initial steps of:

i. mixing the aqueous waste stream with the material to form an aqueous mixed substance; and ii. dewatering the aqueous mixed substance to form said substance.

5. The method of claim 4 which also comprises the initial steps of:

iii. analyzing the mixed substance for ferric hydroxide; and iv. controlling the quantity of the acid based upon the amount need to stoichiometrically react with the ferric hydroxide.

6. The method of claim 5 wherein the acid is a hydrochloric solution comprising from 10 to 16% hydrochloric acid and the dissolving step comprises:

transferring the controlled quantity of acid to intimately contact the material; and agitating the acid and substance mixture to form a salt based solution.

7. The method of claim 6 wherein the agitating during said dissolving step is accomplished during a residence time and in a reaction zone, said method also comprises:

controlling the acid temperature to approximately ambient conditions; and maintaining the agitating for a residence time of no less than 15 minutes.

8. The method of claim 6 wherein the agitating during said dissolving step is accomplished during a residence time and in a reaction zone, said method also comprises:

heating the acid prior to introduction into said reaction zone to a temperature of at least 65° C.; and maintaining the agitating for a residence time of no less than 20 minutes.

9. The method of claim 6 wherein the agitating during said dissolving step is accomplished during a residence time and in a reaction zone, said method also comprises:

heating the material and acid mixture within said reaction zone to a temperature of approximately 95° C.; and maintaining the agitating for a residence time of no less than 15 minutes.

10. The method of claim 9 wherein the dissolving step produces a soluble salt and at least one insoluble salt, and wherein each of said separating and removing steps comprises:

first filtering out at least a portion of the insoluble salt to form a filter cake and a first filtrate;

treating the first filtrate to precipitate further salts; and second filtering out at least some of the further precipitated salts to form a second filter cake and second filtrate.

11. The method of claim 10 wherein said separating and removing steps also comprise:

washing said filter cakes with an aqueous solution; and removing said filter cakes from said filters.

12. The method of claim 11 wherein said separating and removing steps also comprise:

cooling of the second filtrate to within a temperature range from 0° C. to 23° C. to form still further precipitated material; and third filtering out at least some of the still further precipitated material.

13. The method of claim 12 wherein said initial process adds a liquid salt to the waste stream to form a mixture while rapidly oxidizing the mixture in conjunction with agitation, so as to produce a ferric chloride based solution and an iron based amorphous precipitate containing a majority of the heavy metals, followed by separation of the amorphous precipitate solution, and wherein said reducing step comprises:

mixing said ferric chloride based solution with a reducing agent capable of reducing most of said ferric chloride based solution to a ferrous chloride based solution; and agitating said reduced mixture.

14. A method comprising:

(1) removing a substantial proportion of heavy metals from an aqueous media by forming a substantially completely amorphous ferric hydroxide precipitate comprising a heavy metal and a substantial proportion of iron;

(2) dissolving at least a major proportion of said precipitate in an acid to form an acidic solution containing a portion of said heavy metal;

(3) separating the product from step (2) into an acidic solution and a solid material and (4) introducing said acidic solution into a reactor vessel wherein a heavy metal is being precipitated from said acidic solution.

15. A method as defined in claim 14 wherein step (1) is accomplished by rapidly oxidizing ferrous ions at a controlled pH in a reaction zone into which said aqueous media is introduced, and wherein said acid in step (2) is a hydrochloric acid solution.

16. A method as defined in claim 15 wherein said introducing in step (4) comprises recycling at least a portion of said acidic solution to step (1).

17. A method as defined in claim 16 wherein step (4), prior to said recycling, comprises the further steps of:

recovering the acidic solution separated from step (3); and reducing a substantial portion of any ferric ion present in said recovered acidic solution to ferrous ion.

18. A method as defined in claim 17 wherein the pH in step (1) is controlled to be in the range of from 6.5 to 8.0 and the aqueous media in step (1) is maintained under conditions of high agitation.

19. The method as defined in claim 18 wherein steps (1) to (4) are performed as a continuous process.

20. The method of claim 18 wherein heavy metals are recovered from said solid material after said separating step (3).

21. The method of claim 20 wherein the iron content of said amorphous precipitate is from 40 to 60 weight percent.

22. The method of claim 21 wherein the reducing is accomplished by contacting the recovered acidic solution with iron bearing materials.

23. The method of claim 22 wherein the dissolving is accomplished at approximately ambient temperature conditions.

24. The method of claim 22 wherein the dissolving step also comprises heating the acid prior to introduction to said precipitate.

25. The method of claim 24 wherein said heating raises the temperature of the acid to at least 65° C.

26. The method of claim 25 wherein said hydrochloric acid solution comprises from 10 to 16 wt % hydrochloric acid and the dissolving step comprises:

transferring a controlled quantity of acid to intimately contact said precipitate; and agitating the acid solution and precipitate mixture to form a salt based solution having at least one insoluble salt and at least one soluble salt.

27. The method of claim 26 wherein said controlled quantity of acid solution is based upon the amount needed to stoichiometrically react with a majority of the ferric ions present.

28. The method of claim 27 wherein said separating also comprises:

filtering out at least a portion of said solid material to form a filter cake and a filtrate;

treating the filtrate to precipitate further salts; and filtering out at least a portion of the precipitated salts from the preceding step to form a second filter cake.

29. The method of claim 28 wherein said heating raises the temperature of the acid to approximately 95° C.

* * * * *